United States Patent

Hahn et al.

[11] Patent Number: 5,486,634
[45] Date of Patent: Jan. 23, 1996

[54] METHOD FOR THE PREPARATION OF ORGANOPOLYSILOXANES WITH SECONDARY AMINOALKYL GROUPS LINKED THROUGH A CARBON ATOM TO A SILICON ATOM

[75] Inventors: Günter Hahn; Klaus-Dieter Klein, both of Mülheim; Dietmar Schäfer, Hattingen, all of Germany

[73] Assignee: Th. Goldschmidt AG, Essen, Germany

[21] Appl. No.: 362,098

[22] Filed: Dec. 22, 1994

[30] Foreign Application Priority Data

Dec. 23, 1993 [DE] Germany ............... 43 44 082.7

[51] Int. Cl.⁶ ........................................ C07F 7/10
[52] U.S. Cl. ............................................... 556/425
[58] Field of Search ................................. 556/425

[56] References Cited

U.S. PATENT DOCUMENTS

| | | |
|---|---|---|
| 4,892,918 | 1/1990 | Ryang . |
| 4,921,988 | 5/1990 | Takatsuna et al. .............. 556/425 X |
| 5,026,890 | 6/1991 | Webb et al. ...................... 556/425 X |
| 5,077,421 | 12/1991 | Selvig ................................ 556/425 |
| 5,101,056 | 3/1992 | Kampling et al. . |
| 5,132,443 | 7/1992 | Traver et al. ..................... 556/425 |

*Primary Examiner*—Paul F. Shaver
*Attorney, Agent, or Firm*—Anderson Kill Olick & Oshinsky

[57] ABSTRACT

A method for the synthesis of organopolysiloxanes having

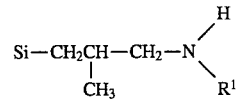

group, wherein $R^1$ is an alkyl group with 1 to 4 carbon atoms, is described. The products are obtained by the hydrosilylation of compounds of the formula

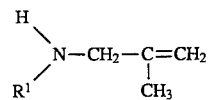

with hydrogensiloxanes, the addition taking place exclusively in the form of a γ addition.

3 Claims, No Drawings

METHOD FOR THE PREPARATION OF ORGANOPOLYSILOXANES WITH SECONDARY AMINOALKYL GROUPS LINKED THROUGH A CARBON ATOM TO A SILICON ATOM

FIELD OF THE INVENTION

The invention relates to a method for preparing organopolysiloxanes having secondary amino groups linked over carbon atoms to silicon atoms, by hydrosilylating secondary aminoalkenes with hydrogensiloxanes in the presence of platinum catalysts and optionally followed by equilibrating the organo-modified organopolysiloxanes in basic condition with cyclic siloxanes until the average molecular weight is adjusted to the desired value.

BACKGROUND INFORMATION AND PRIOR ART

Organopolysiloxanes with secondary amino groups are known from U.S. Pat. No. 5,101,056. The compounds are synthesized by reacting polysiloxanols having terminal SiOH groups with silanes having the formula

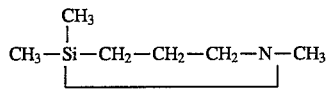

However, this reaction competes with the condensation reaction of the siloxanols and yields a mixture of compounds of different functionality and chain length. Moreover, the synthesis of the silazane is expensive.

U.S. Pat. No. 4,892,918 discloses a method for synthesizing organopolysiloxanes with secondary amino groups by reacting (a) an N-substituted N-alkenylmonoamine, the olefinic double bond of which is at least two carbon atoms removed from the amine nitrogen, with (b) an SiH-functional organopolysiloxane of the formula

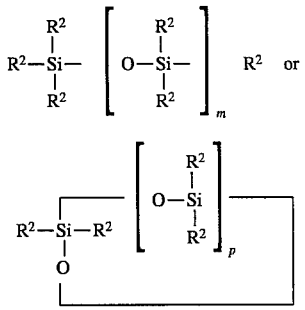

wherein each $R^2$ group can be a hydrogen, alkyl, alkoxy, cyanoalkyl, halogenalkyl, acetoxy, an optionally substituted cycloalkyl, aryl or aralkyl group, or with a siloxane of the formula

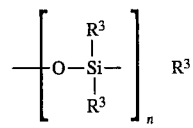

wherein m and n are natural numbers from 1 to about 10,000, p is a natural number from 2 to 20 and the sum of m+n is less than about 10,000, and wherein $R^3$ can be a hydrogen, alkyl, alkoxy, cyanoalkyl, halogenalkyl, acetoxy, an optionally substituted cycloalkyl, aryl or aralkyl group, with the proviso that at least one $R^2$ group or $R^3$ group is a hydrogen group, (c) in the presence of an effective amount of hydrosilylation catalyst.

With this reaction, a mixture of reaction products is obtained, since the addition reaction can proceed in the form of a β and a γ addition:

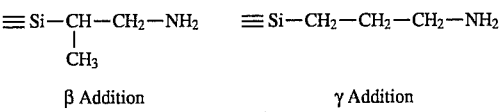

However, the formation of products corresponding to a β addition is undesirable, since the heat stability of these products is less than that of products of the γ addition.

Surprisingly, it has now been found that organopolysiloxanes with secondary aminoalkyl groups linked by way of carbon atoms to silicon atoms, are obtained practically to the exclusion of the formation of γ addition products if, secondary aminoalkenes of the following general formula

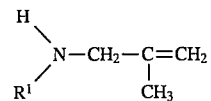

wherein $R^1$ represents an alkyl group with 1 to 4 carbon atoms, are used pursuant to the inventive method for the hydrosilylation.

This is surprising also inasmuch as the vinyl alkyl group represents additional stearic hindrance and also changes the electronic structure of the double bond to the disadvantage of the reaction. One would therefore have to expect that the course of the reaction would, at the very least, be hindered appreciably, quite apart from the surprising observation of the exclusive γ addition.

Preferably, compounds of the general formula

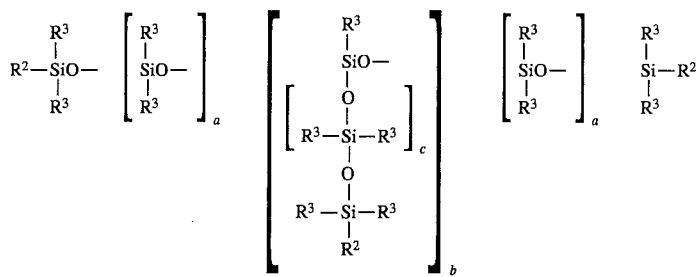

in which

R³ in an average molecule represents alkyl groups with 1 to 18 carbon atoms or aryl groups, with the proviso that at least 90% of the R³ groups are methyl groups, R² represents the R³ group or hydrogen groups, with the proviso that there must be at least two R² groups in an average molecule, a has a value of 0.5 to 100, b has a value of 0 to 5, and c has a value of 0 to 100, are used as hydrogensiloxanes for the inventive method.

Particularly preferred is the hydrogensiloxane where R² is a hydrogen, R³ a mthyl, a has a value from 0.5 to 5, b has a value of 0, and c has a value from 1 to 10.

An example of a particularly preferred hydrogenpolysiloxane is a compound of the formula below in which x can have values of, for example, 5 or 9 or 15:

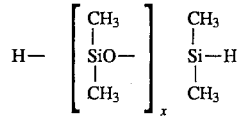

Siloxanes of the general formula

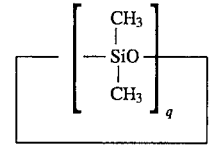

wherein q has a numerical value of 4 or 5, are used as cyclic siloxanes for the equilibration reaction for adjusting the molecular weight to the desired value (chain length and, with that, an appropriate viscosity of the polysiloxane).

The hydrosilylation reaction proceeds in the presence of a platinum catalyst, which is known for such reactions and described, for example, in U.S. Pat. No. 4,892,918. Complex catalysts, such as platinum/pyridine/halogen complex catalysts, are particularly preferred.

The hydrosilylation reaction preferably is carried out with a certain excess of aminoalkenes, such as a 15 molar percent excess, based on one SiH group. Solvents do not have to be used; however, they do not interfere with the reaction if they are inert. The reaction temperature generally and preferably is about 140° C. to 160° C. The reaction time is 1 to 8 hours and preferably 1 to 3 hours.

Examples of inventively obtained, modified polysiloxanes with secondary amino groups as well as of branched siloxanes, wherein subscript a has a value of 1 and subscript b a value of 2, are

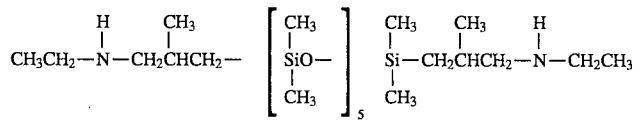

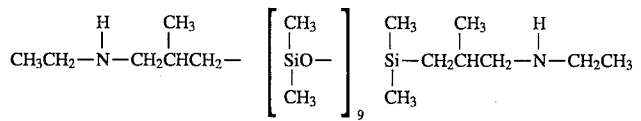

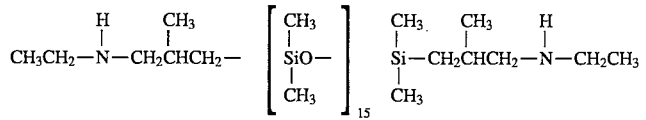

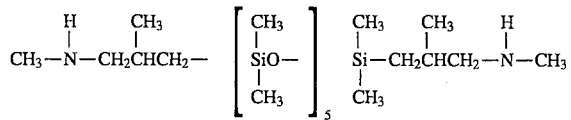

-continued

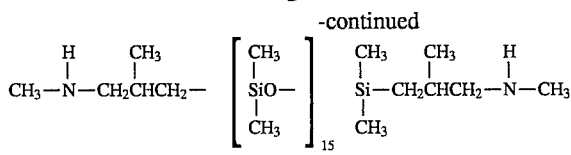

The siloxanes with terminal, secondary aminoalkyl groups, obtained pursuant to the invention, can be used for the treatment of textiles, in order to impart to them a soft handle and some antistatic properties. However, the compounds, obtained pursuant to the invention, can be used, in particular, as reactive components for the synthesis of polymeric compounds.

One possible use for these compounds is as cross-linking component in epoxide resins to improve the viscosity of the epoxide resins, particularly at low temperatures.

A further use is their reaction with siloxanes, which have terminal epoxide groups, in order to obtain polymers, which are used to coat textiles. These coatings impart a soft handle on the textiles.

The compounds can be reacted with diisocyanates to form polyureas. The reaction of secondary amino groups with isocyanates can be controlled well and leads to linear polyureas, which, in contrast to the reaction with primary amines, do not tend to gel. Moreover, the interactions between the urea groups are attenuated by the alkyl substituents, so that the polyureas can be processed more readily on the extruder or an injection molding machine. Polyureas of this type are also suitable for coating textiles.

A further possible use of the compound, obtained pursuant to the invention, consists of mixing them with diamines and subsequently reacting them together with diisocyanates. Thermoplastic polyurethane materials are obtained, which can be used for the production of medical equipment, such as tubes and catheters.

Because of their good stability in the presence of oil and gasoline, the thermoplastic polyurethane materials can also be used as sealing materials in the construction of automobiles.

The inventive method is described in even greater detail in the following examples, it being understood that these examples are provided by way of illustration and not by way of limitation.

EXAMPLE 1

Synthesis of an α, ω-Di((N-ethyl)amino(2-methyl)propyl)(polydimethyl)siloxane

To a 2 L, 4-neck flask, equipped with stirrer, reflux condenser, thermometer and a dropping funnel, 1000 g of an α, ω-dihydrogen(poly-dimethyl)siloxane, with a hydrogen content of 0.3022% (661.8 g/mole), as well as 20 ppm of a platinum complex (based on the total formulation and platinum content) are added and heated to 150° C. After that, 386 g of N-ethylmethallylamine (3.9 moles; 30% excess) are added dropwise at such a rate that the internal temperature does not exceed 155° C.

After the addition is completed, the reaction mixture is stirred at 150° C. until the SiH conversion, detected volumetrically or IR spectrophotometrically, is completed. In this connection, it must be taken into consideration that the reaction time is determined primarily by the quality of the alkenyl amine used.

The product is then freed from excess amine and other volatile products at 100° C. under the vacuum of an oil pump and filtered. A clear, colorless liquid of low viscosity is obtained.

Nitrogen content according to $HClO_4$ titration: 3.02%.

NMR spectroscopy indicates that the γ addition reaction has taken place exclusively.

$^1$H-NMR: δ=0.04 ppm (s, Si—$CH_3$); 0.30 to 0.75 ppm (2H, m, Si—$CH_2$—); 0.95 ppm (3H, d, $CH_3$—CH); 1.11 ppm (3H, t, $CH_3$—$CH_2$—); 1.80 ppm (1H, m, CH); 2.45 ppm (2H, m, $CH_2$—CH); 2.62 ppm (2H, q, $CH_2$—$CH_3$).

$^{29}$Si-NMR: δ=–22 ppm (—$(CH_3)_2$SiO—, 7.85 Si); 7.2 ppm (Si—$CH_2$CH($CH_3$)$CH_2$NH$CH_2$$CH_3$, 2 Si).

The product, synthesized in Example 1, can be equilibrated with cyclic siloxanes with molecular enlargement. For this purpose, 926.9 g (1 mole) of the product obtained are mixed in a 10 L reaction vessel with 6685 g (90 moles) of cyclotetradimethylsiloxane and 1.9 g (11 mmoles) of tetramethylammonium hydroxide pentahydrate and stirred for 10 hours at 90° C., during which time the viscosity increases steadily.

Subsequently, the temperature is raised to 160° C. and the basic equilibration catalyst is thus decomposed within 3 hours. The product is now freed from volatile components under the vacuum of an oil pump and filtered.

In this way, a clear and colorless liquid, with a Brookfield viscosity of approximately 185 mPa×sec and a nitrogen content of 0.35% is obtained.

The product obtained has a chain length of approximately 100.

EXAMPLE 2

Synthesis of an α, ω-Di((N-Methyl)amino(2-methyl)propyl)(polydimethyl)siloxane

To a 2 L, 4-neck flask with stirrer, reflux condenser, thermometer and dropping funnel, 1,000 g of an α, ω-dihydrogen(polydimethyl)siloxane with a hydrogen content of 0.3022% (661.8 g/mole) as well as 20 ppm of a platinum complex (based on the total formulation and the platinum content) are added and heated to 150° C. After that, 335 g of N-methylmethallylamine (3.9 moles; 30% excess) are carefully added dropwise in such a manner, that the internal temperature does not exceed 155° C. At the end of the addition, the reaction mixture is stirred at 150° C., until the SiH conversion is completed, as determined volumetrically or by IR spectrophotometry.

The product is then freed from the excess amine and other volatile products at 100° C. under the vacuum of an oil pump and filtered. A clear, colorless liquid of low viscosity is obtained.

Nitrogen content according to $HClO_4$ titration: 3.11%.

According to NMR spectroscopy, only the γ adduct is formed as follows:

$^1$H-NMR: δ=0.04 ppm (s, Si—CH$_3$); 0.30 to 0.75 ppm (2H, m, Si—CH$_2$—); 0.95 ppm (3H, d, CH$_3$—CH); 1.80 ppm (1H, m, CH); 2.45 ppm (2H, m, CH$_2$—CH); 2.32 ppm (6H, q, N—CH$_3$); $^{29}$Si-NMR: δ=–22 ppm (—(CH$_3$)$_2$SiO—, 7.85 Si); 7.2 ppm (Si—CH$_2$CH(CH$_3$)CH$_2$NHCH$_2$CH$_3$, 2 Si).

EXAMPLE 3

(Comparison Example)

Synthesis of an α, ω-Di((N,N'-dimethyl)aminopropyl)(polydimethyl)siloxane

To the apparatus described in Examples 1 and 2, 1,000 g of an α, ω-dihydrogen(polydimethyl)siloxane with a hydrogen content of 0.3022% (661.8 g/mole) as well as 20 ppm of a platinum complex (based on the total formulation and on the platinum content) are added and reacted with 335 g (3.9 moles) of N,N'-dimethyallylamine at a temperature of 125° to 130° C. After distillation and filtration, a light yellow liquid of low viscosity is obtained.

Nitrogen content according to HClO$_4$ titration: 3.38%.

The integration of the $^1$H as well as of the $^{29}$Si NMR spectroscopy indicates that, aside from a 90% γ addition, there has also been a 10% β addition:

$^1$H-NMR: δ=0.04 ppm (s, Si—CH$_3$); 0.44 ppm (2H, m, Si—CH$_2$); 0.95 ppm (d, CH$_3$—CH, β-addition); 1.44 ppm (2H, m, —CH$_2$—); 2.10 ppm (8H, m, (CH$_3$)$_2$N and —CH$_2$—N);

$^{29}$Si-NMR: δ=–22 ppm (—(CH$_3$)$_2$SiO—); 7.7 ppm γ-addition; 8.2 ppm β-addition.

This example makes it clear that, when an allylamine derivative is used instead of a methallyl derivative, the resulting reaction is not exclusively a γ addition. A mixture of compounds is obtained, which is the result of a 90% γ addition and 10% β addition.

If allylamine is used as amine component, the tendency to form β addition products is increased significantly further.

EXAMPLE 4

(Comparison Example)

Synthesis of an α, ω-Di(aminopropyl)(polydimethyl)siloxane

To the apparatus described in Examples 1 and 2, 1,000 g of an α, ω-dihydrogen(polydimethyl)siloxane with a hydrogen content of 0.3022% (661.8 g/mole) as well as 20 ppm of a platinum complex (based on the total formulation and on the platinum content) are added and reacted with 222 g (3.9 moles) of allylamine at a temperature of 125° to 130° C. After distillation and filtration, a light yellow liquid of low viscosity is obtained here also.

Nitrogen content according to HClO$_4$ titration: 3.65%.

Integration of the $^1$H as well as of the $^{29}$Si NMR spectroscopy indicates that, aside from portions of Si—N—C-linked product (because of the unprotected amine group), the Si—C-linked portion can be attributed to a 75% γ addition reaction and a 25% β addition reaction.

$^1$H-NMR: δ=0.06 ppm (s, Si—CH$_3$); 0.55 ppm (2H, m, Si—CH$_2$); 0.95 ppm (d, CH$_3$—CH, β-addition); 1.45 ppm (2H, m, —CH$_2$—); 2.65 ppm (m, —CH$_2$—N).

$^{29}$Si-NMR: δ=–22 ppm (—(CH$_3$)$_2$SiO—); 7.80 ppm γ-addition; 8.30 ppm β-addition.

What is claimed is:

1. A method for the synthesis of organopolysiloxanes having secondary aminoalkyl groups linked over carbon atoms to silicon atoms comprising the steps of hydrosilylating secondary aminoalkenes with hydrogen siloxanes in presence of platinum catalysts and, optionally, by subsequently equilibrating under basic conditions thus obtained organo-modified organopolysiloxanes with cyclic siloxanes, further comprising that the secondary aminoalkene has a general formula

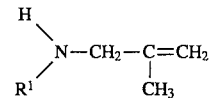

wherein R$^1$ is an alkyl group having 1 to 4 carbon atoms, with the proviso that the secondary aminoalkene is linked to the silicon atoms exclusively through a γ-addition.

2. The method of claim 1, comprising reacting, as hydrogen siloxanes, compounds having a general formula

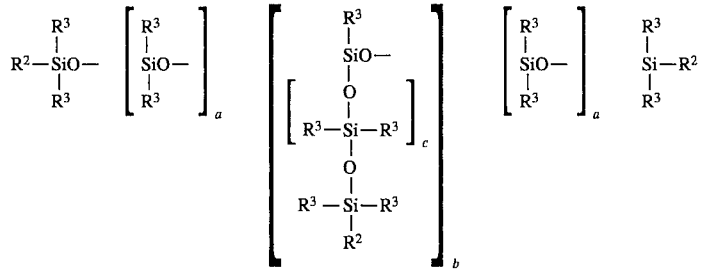

in which

R$^3$ in an average molecule represents alkyl groups with 1 to 18 carbon atoms or aryl groups, with the proviso that at least 90% of the R$^3$ groups are methyl groups, R$^2$ represents the R$^3$ group or a hydrogen group, with the proviso that there must be at least two R$^2$ groups in an average molecule, a has a value of 0.5 to 100, b has a value of 0 to 5, and c has a value of 0 to 100.

3. The method of claim 2, further comprising reacting, as hydrogen siloxanes, compounds where
   $R^2$ represents a hydrogen group, and
   $R^3$ represents a methyl group,
   a has a value of 0.5 to 5,
   b has a value of 0, and
   c has a value of 1 to 10.

* * * * *